Feb. 20, 1951     H. G. MANSON ET AL     2,542,824
STOKER CONTROL

Filed May 10, 1948     6 Sheets-Sheet 1

INVENTORS
HARRY G. MANSON
ROBERT P. HANSEN
BY
Toulmin & Toulmin
ATTORNEYS

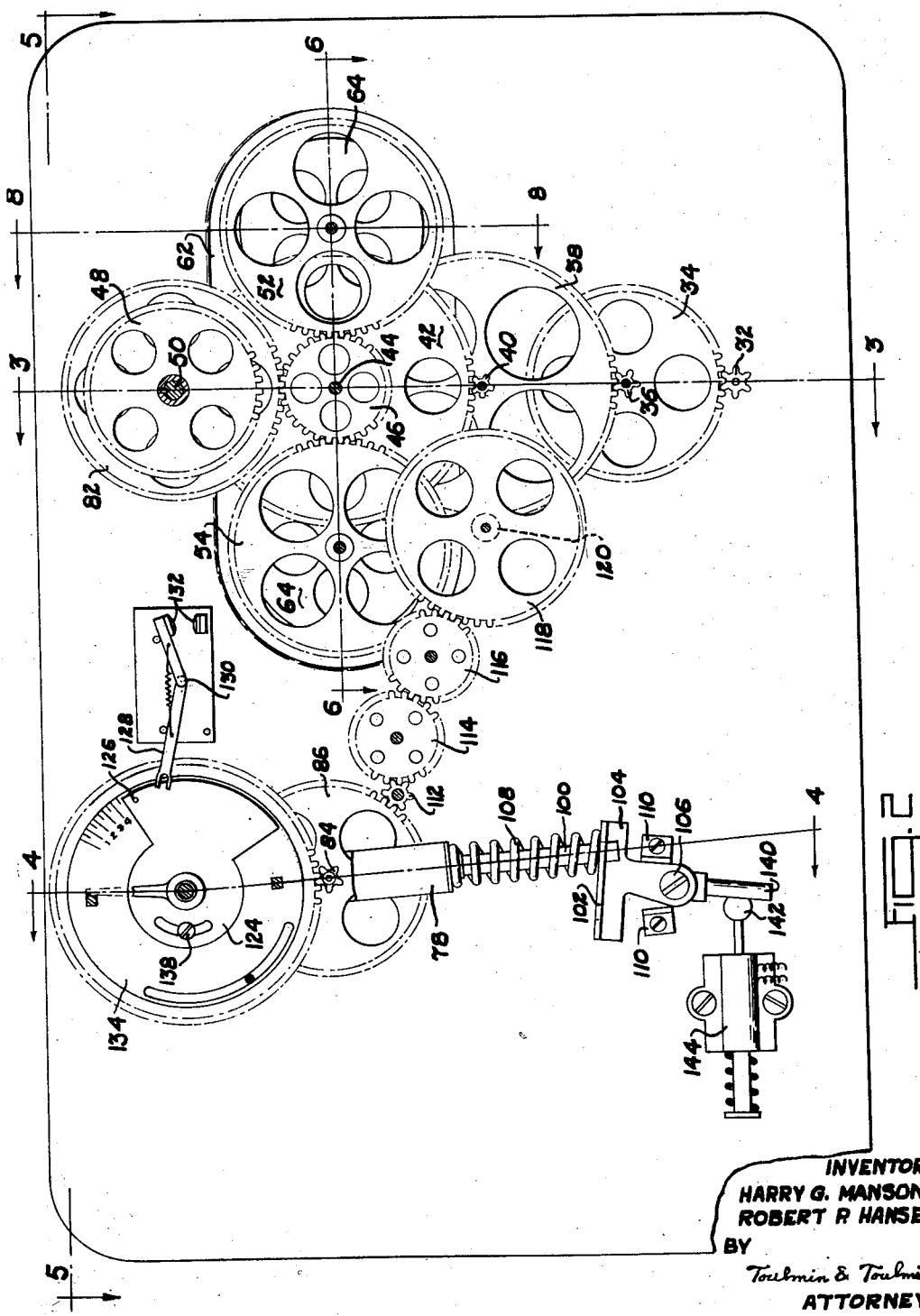

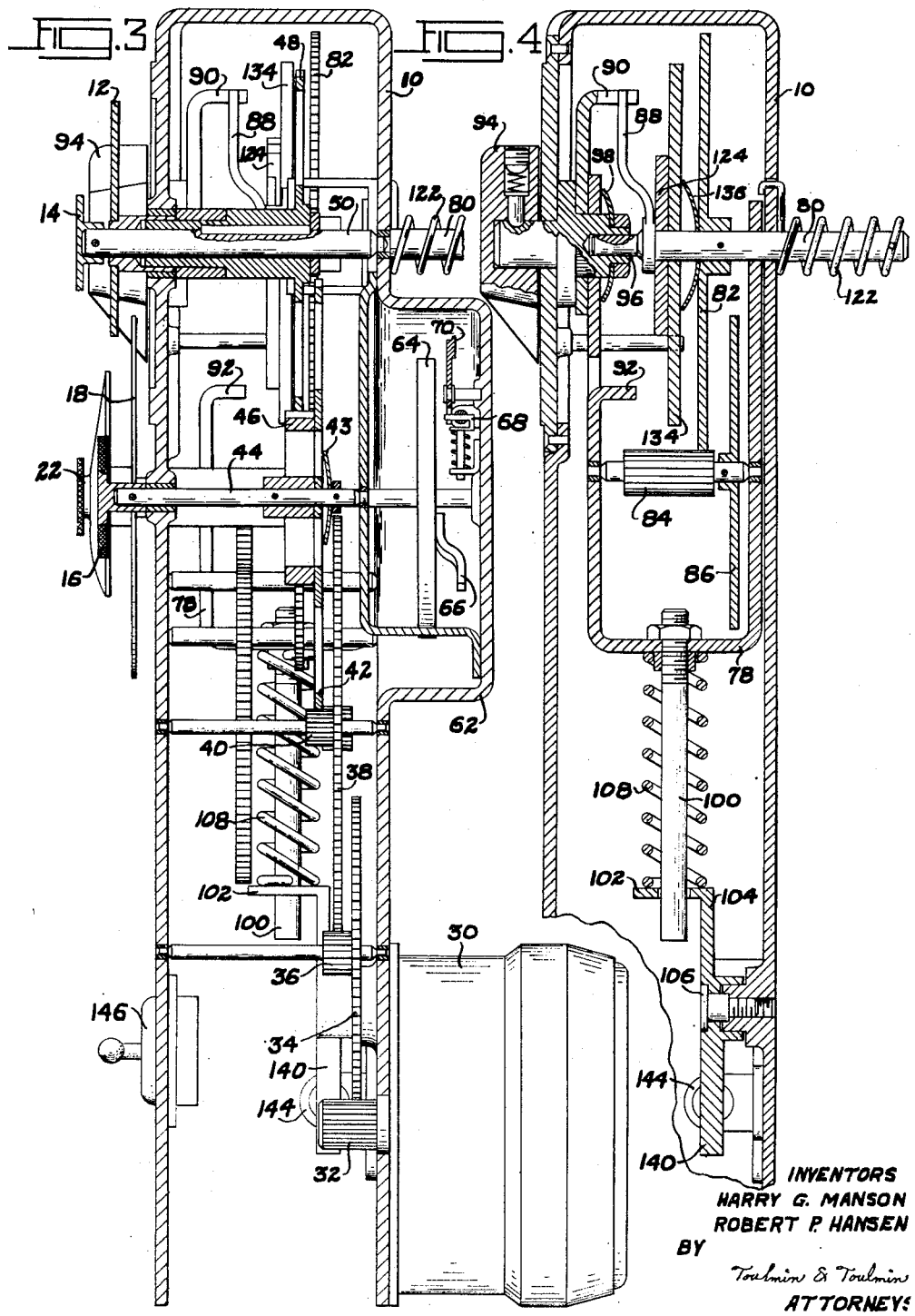

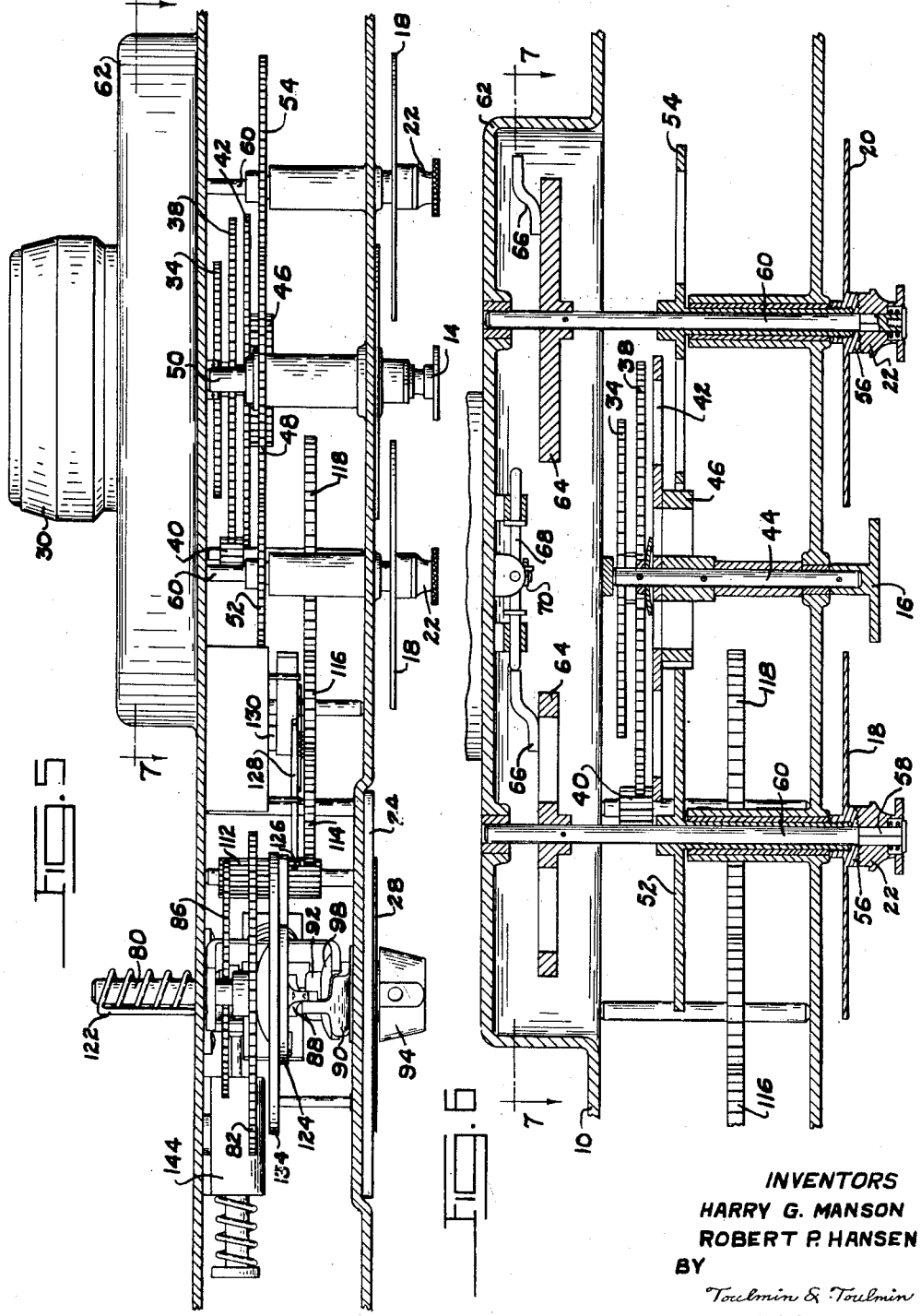

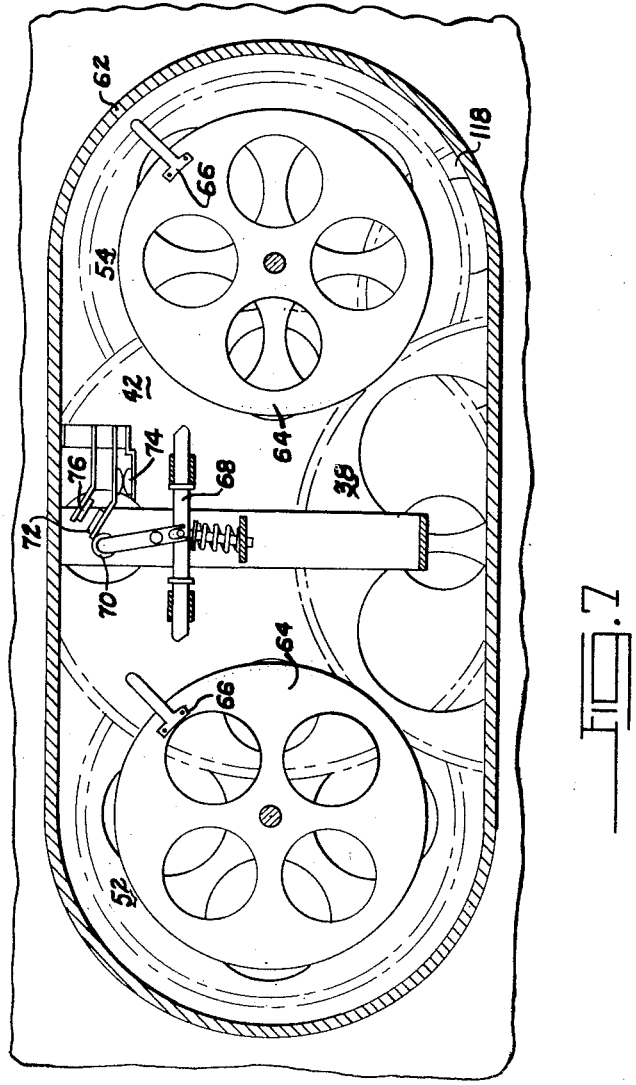

Feb. 20, 1951     H. G. MANSON ET AL     2,542,824
STOKER CONTROL
Filed May 10, 1948     6 Sheets-Sheet 6
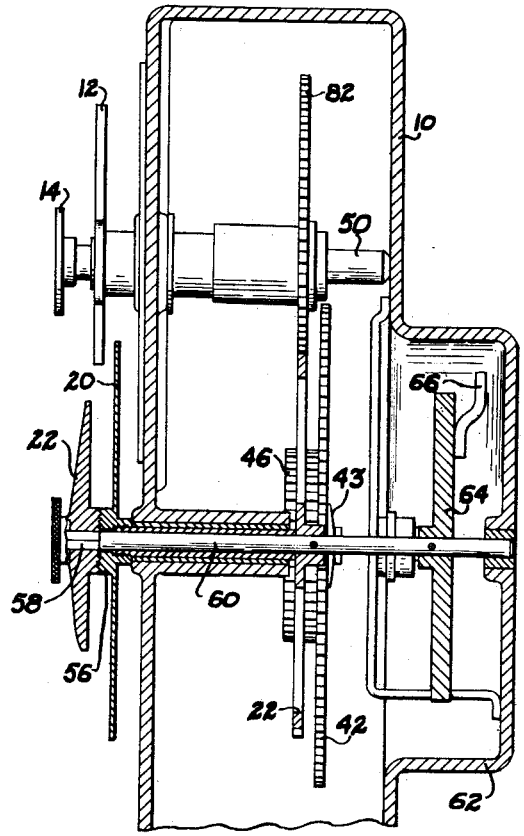
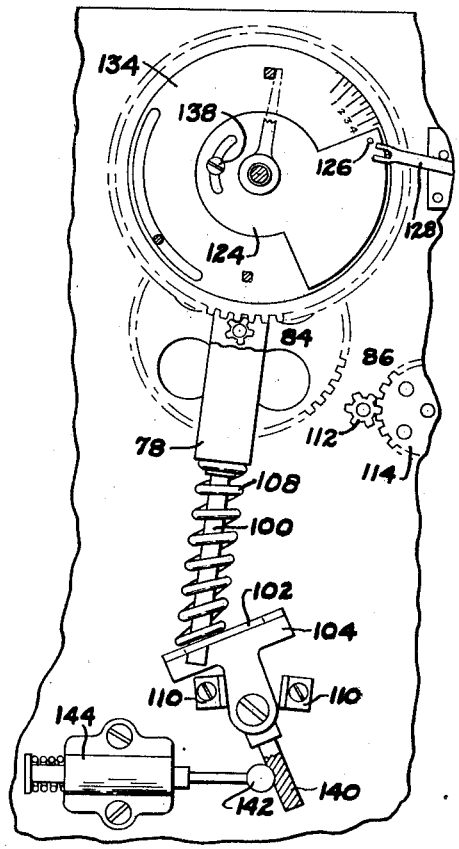
INVENTORS
HARRY G. MANSON
ROBERT P. HANSEN
BY
Toulmin & Toulmin
ATTORNEYS Patented Feb. 20, 1951

2,542,824

UNITED STATES PATENT OFFICE 2,542,824

STOKER CONTROL

Harry G. Manson and Robert P. Hansen, Princeton, Ind., assignors to Hansen Manufacturing Company, Princeton, Ind., a corporation of Indiana Application May 10, 1948, Serial No. 26,058

9 Claims. (Cl. 161—1)

This invention relates to time switches, and particularly to devices of this type especially adapted for use in controlling stokers and similar mechanisms.

Most automatic stoker controls include an overall controlling portion which selects between normal day-time stoker operation and night-time operation which is generally of a hold-fire nature.

Such controls also usually include, and ordinarily as an entirely separate mechanism, instrumentalities for effecting hold-fire operation of the stoker during the night period.

A hold-fire control of this type consists of means for intermittently energizing the stoker drive motor so that the fire which the stoker is feeding is maintained at some predetermined burning rate which prevents the fire from going out during the night and which may also, especially in severe weather, provide sufficient heat units to maintain the building being heated up to a certain temperature.

As mentioned before, stoker controls of this type generally include the two sections identified above and which are generally separately constructed although often placed in a single frame to be sold as a unit.

The present invention has as its primary object the construction of a stoker control arrangement which is truly unitary in character in that it employs only a single driving motor.

Another object of this invention is to provide an improved time switch to be adapted for use in stoker controls and the like and which is very convenient to adjust at any time.

It is also an object of this invention to provide a time switch having a driven part which is engaged and disengaged from the driving motor in order to make it selectively effective or ineffective.

A still further object is the provision of a stoker control device which is connected with building thermostats and the like and which operates over a 24-hour period to control a stoker through normal and hold-fire operations.

These and other objects and advantages will become more apparent upon reference to the following description taken in connection with the accompanying drawings in which:

Figure 2 is a view looking at the switch in the same direction as Figure 1 but with the front cover of the switch removed in order to show the various gear trains and other devices;

Figure 3 is a vertical section indicated by the lines 3—3 on Figures 1 and 2;

Figure 4 is a vertical section indicated by the lines 4—4 on Figures 1 and 2;

Figure 5 is a plan section indicated by the lines 5—5 on Figures 1 and 2;

Figure 6 is a plan section indicated by the lines 6—6 on Figures 1 and 2;

Figure 7 is a sectional view indicated by the lines 7—7 on Figures 5 and 6;

Figure 8 is a vertical section indicated by the lines 8—8 on Figures 1 and 2;

Figure 9 is a view showing a portion of the device illustrated in Figure 2 in another operative position.

Figure 1:
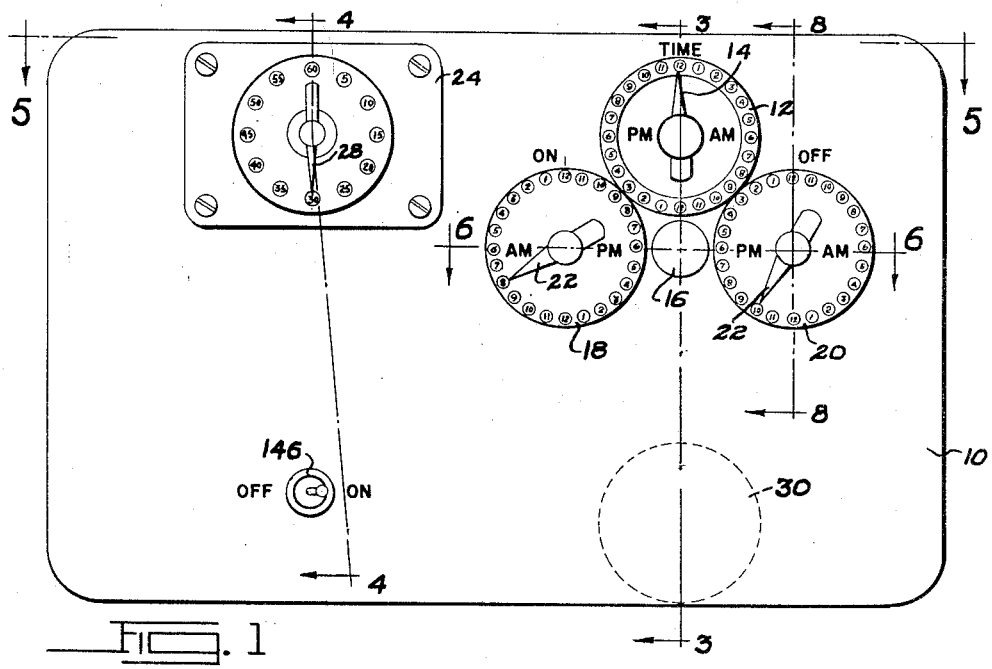
Figure 1 is a front elevational view showing a control switch constructed according to this invention.

Referring to the drawings, the device of this invention comprises a frame or box like enclosure 10, and formed thereon as at 12 is a dial inscribed with numerals for indicating the hour and whether it be a. m. or p. m. A pointer 14 sweeps over the said dial and an adjusting knob 16 may be provided for correcting the position of the pointer 14 should the indicating position thereof be incorrect.

Adjacent the stationary dial 12 are a pair of other similarly inscribed dials 18 and 20 which are rotatable and geared to the pointer 14 to rotate in unison therewith. Associated with each of the dials 18 and 20 is a pointer 22 adjustably connected therewith and adapted for normally rotating with the said dials. These pointers are adjustable to indicate certain times of the day at which the device effects controlling adjustments in the stoker motor operating circuits.

Also mounted on the frame 10 is a hold-fire or cycling arrangement 24 including a dial 26 over which is movable a pointer 28. The device 24, as will become apparent hereinafter, is the hold-fire part of the stoker control and is operable for intermittently energizing the stoker drive motor and for predetermined periods of time thereby to prevent the fed fire from going out during the night or during any other period that the building being warmed would not have to be kept up to full temperature.

The drive arrangement for the pointer 14 and the dials 18 and 20 is best illustrated in Figures 2 and 3. In these figures it will be seen that the frame 10 mounts a synchronous electric drive motor 30 which carries a pinion 32. The pinion 32 runs on a gear 34 which is mounted on a shaft with another pinion 36. The pinion 36 in turn drives through a gear 38 which is mounted on the same shaft as the pinion 40. The pinion 40 drives into a gear 42 which is frictionally connected with the shaft 44 that supports the adjusting knob 16 referred to above.

Pinned to the shaft 44 is another drive gear 46 and meshing with the gear 46 is a gear 48 carried on the shaft 50 which drives the pointer 14. Also meshing with the gear 46 is a gear 52 which is the same size as the gear 48 and which is connected with the dial 20. A gear 54 of the same size as the gears 48 and 52 also meshes with the gear 46 and is connected for driving the dial 18. The connections between the gears 52 and 54 and their respective dials 20 and 18 is best illustrated in Figure 6 wherein it will be seen that each of the said gears has a sleeve part and on the end of which is mounted the associated dial.

The frictional connection of the gear 42 with the shaft 44 permits the simultaneous adjustment of the pointer 14 and the dials 18 and 20 in order to correct for the position thereof when the clock has been stopped due to the power being shut off or for some other reason. Normally the frictional connection between the gear 42 and the shaft 44 is effected by the spring washer indicated at 43 and is sufficient for maintaining a driving connection between the said gear and shaft.

Each of the pointers 22 is connected with its corresponding dial 18 or 20 by means of a spring pressed clutch portion indicated at 56. The pointers are squared to fit over the square portion 58 of the shafts 60 and thus normally effect a driving engagement between the shafts and the dials. However, when the pointers are adjusted relative to the dials by pulling the pointers out against their loading springs and turning them, the said shafts rotate with the pointers.

Attached to the shafts 60, that are within the recess 62 formed in the back wall of the frame 10, are a pair of cam wheels 64 each of which carries a cam member 66 adapted for engagement with a snap action switch mechanism indicated at 68. This switch mechanism will be best seen in Figures 6 and 7, and it will be apparent that it comprises a toggle mechanism including an arm having a roller 70 at the end thereof which will be in a leftward position after the switch has been actuated by the cam 66 associated with the dial 18, and in a rightward position after the switch has been actuated by the cam 66 associated with the dial 20. The switch proper, associated with the toggle switch arrangement, includes a movable contact 72 which closes on a stationary contact 74 when the roller is in its leftward position and which closes on a contact 76 when the roller is in its rightward position.

As explained above, each of the cam wheels 64 can be adjusted relative to its driving disc and thereby accurately controls the time of day when the switch mechanism 68 will be actuated by the cams carried by the said cam wheels. Thus, over a period of 24 hours the switch mechanism at 68 will first be actuated into one position by one of the cam wheels and then into another position by the other of the cam wheels.

The aforementioned switch arrangement is for the purpose of selecting between daytime and night time operation of the stoker. During the day time, as will be seen hereinafter, the control of the stoker is effected by a thermostatic switch located in the building being heated. During night time operation the operation of the stoker is controlled by a hold-fire mechanism which intermittently energizes the stoker motor for predetermined periods of time.

The hold-fire portion of the stoker control of this invention is best seen in Figures 2, 4 and 9. This part of the stoker control comprises a frame or bracket 78 which is mounted for free swinging movement about a shaft 80 extending through the back wall of the frame or housing 10.

Mounted in the bracket 78 is a gear train comprising a gear 82 pinned to the shaft 80, a pinion 84 meshing with the gear 82 and a gear 86 rigidly mounted with the pinion 84. The shaft 80 also has mounted thereon an arm 88 and positioned in the rotative path of the arm 88 are a pair of spaced stops 90 and 92 carried by the bracket 78.

The stop 90 is angularly adjustable relative to the bracket 78 by means of a knob 94 which is rigidly connected with the stop 90 and which may provide support for the inner end of the shaft 80 as at 96.

A spring washer 98 provides frictional engagement between the stop member 90 and the bracket 78 so that when the said stop member is positioned by turning the knob 94, it will thereafter remain in that position relative to the bracket 78 until again moved by the said knob.

Reference to Figures 2 and 9 will reveal that extending downwardly from the bottom of the bracket 78 is a rod 100 which extends through a slot 102 and a plate 104 pivoted on a screw 106. A spring 108 bears between the plate 102 and the bottom of the bracket 78 and provides for a toggle action of the bracket as it moves about the shaft 80, thus snapping it sharply into its two operative positions.

The extreme positions to which the bracket 78 will move are determined by the slot 102 in plate 104 and the stops 110 positioned, one on each side of plate 104 and predetermining the limits of movement thereof.

When the bracket 78 is in its Figure 2 position, the gear 86 meshes with an idler pinion 112 mounted on the back of the housing 10 and which is adapted for being driven through a gear train including the gears 114, 116, 118 and pinion 120 by the gear 38. When the bracket 78 is in its other operative position, as shown in Figure 9, the gear 86 is spaced from the pinion 112 and is thus not driven thereby.

Movement of the bracket 78 into its Figure 2 position is accomplished by a torsion spring 122 connected between the shaft 80 and the back wall of the housing 10. This spring acts through the shaft 80 and arm 88 against stop 90 and rotates the bracket 78 counter-clockwise as revealed in Figure 2 into its Figure 2 position. Thereafter the bracket 78 is moved into its Figure 9 position by the engagement of the arm 88 with the stop 92.

The driving of the gear train and the bracket 78 exerts a thrust on the stop 90 which snaps the bracket into its Figure 9 position. It will be noted that at that time the spring 122 is operative to drive the gear train and the arm 88 back to their starting positions thus to bring about movement of the bracket 78 back to its Figure 2 position and reengagement of the gear 86 and pinion 112.

Mounted about the shaft 80 is a cam plate 124 having a pin 126 therein which is adapted for engaging the bifurcated end 128 of one arm of the toggle action switch 130.

It will be apparent that clockwise movement of the cam plate 124 will effect closing of the contact 132 of the switch 130 whereas counterclockwise movement of the said cam plate will open the said contacts. The cam plate is retained in frictional driving engagement with the shaft 80 by means of the disc 134 and the spring washer 136. The cam plate is further adjustable relative to the said disc by means of the screw and slot arrangement 138.

The operation of the hold-fire portion of the stoker control is as follows:

Assuming the bracket 78 to be moved to its Figure 2 position, the gear 86 will be driven and through the pinion 84 and gear 82 will drive the shaft 80 thereby driving the disc 134 and cam plate 124 in a clockwise direction.

After a predetermined time the pin 126 carried by the cam plate will engage and trip the toggle switch 130 into closed position. Thereafter the said switch will remain closed during continuous clockwise movement of the cam plate. Rotation of the cam plate and gearing in the bracket 78 will continue until the arm 88 engages the stop 92. At that time the bracket 78 will be snapped into its Figure 9 position.

The spring 122 now drives the gearing in the bracket 78, the cam plate and the arm 88 backwardly and during this retracting movement of the cam plate the switch 130 will again be tripped into its open position. When the arm 88 has moved to the point where it engages the stop 90, it will again shift the bracket 78 into its Figure 2 position and a new cycle will commence.

It will be apparent that the length of time that the switch 130 is closed will be determined by the location of the cam plate 124 relative to the disc 134 and that the over-all period, including both the closed and open periods, for the switch 130 will be determined by the spacing of the stops 90 and 92.

During normal day time operation of the stoker it is not desired to use the hold-fire feature and to this end the bracket 104 has a rod 140 projecting therefrom which is adapted for engagement with the plunger 142 of a solenoid 144. Energization of the solenoid 144 will move the plunger 142 rightwardly and thrust the bracket 104 in a direction to hold the bracket 78 in its Figure 9 position.

Figure 10:
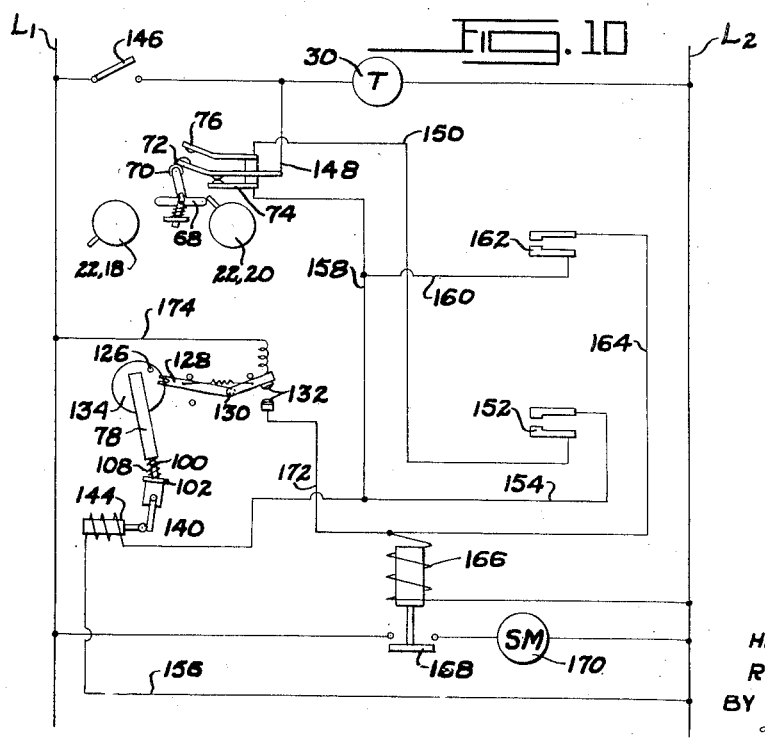
Figure 10 is a wiring diagram showing how the switch of this invention could be connected in circuit with a stoker motor and suitable thermostatic valve switch for controlling the operation of a stoker.

The switches and the solenoid referred to above are connected in circuit with a stoker motor as shown in Figure 10. In Figure 10 the timing motor 30 is connected between the power lines L1 and L2 and in series with an on-off selector switch 146. The power line L1 is also connected by a wire 148 with the movable contact 72 of the switching device 68. The contact 76 of this switching device is connected by a wire 150 with one side of a normally open thermostatic switch 152, the other side of which is connected by a wire 154 with one terminal of the solenoid 144. The other side of the solenoid 144 is connected by a wire 156 with the power line L2. The other contact 74 of the switching device 68 is connected by a wire 158 with the wire 154 and also by a wire 160 with one side of the thermostatic switch 162, the other side of which is connected by a wire 164 with one side of a relay coil 166. The other side of the relay coil 166 is connected with the power line L2. The relay is operable, when energized, to move its blade 168 into position to complete a circuit between the lines L1 and L2 and through the stoker motor indicated at 170. The end of the coil 166 connected with the wire 164 is also connected by a wire 172 with one of the contacts 132, the other of which is connected by a wire 174 with the power line L1.

The thermostatic switch 152 referred to above is normally open but closes at a predetermined temperature, whereas the thermostatic switch 162 is normally closed but opens at a predetermined temperature. The switch 162 is for the purpose of effecting normal day-time control of the stoker motor relay coil 166, whereas the switch 152 becomes effective for night-time operation and controls the effectiveness of the cycling hold-fire arrangement which includes the toggle switch 130.

*Operation*

The operation of the stoker control unit of this invention is briefly as follows:

The stoker motor is connected in circuit with the control unit, the stoker motor, control relay, and the control thermostats as shown in Figure 10.

It will be understood that other suitable and well known thermostatic control elements could be added to the circuit as it is desired, as, for example, a stack control to prevent the fire bed from overheating, or other elements designed to detect certain temperatures and translate them into control impulses.

The unit having been connected in circuit with the stoker motor and the controlling thermostats, the pointers 22 are set relative to their respective dials 18 and 20 to select the times at which normal day time operations of the stoker motor begin and end.

The beginning of the time operation will be determined by the setting of the pointer 22 associated with the dial 18, and this pointer and dial arrangement is operative to throw the switch mechanism at 68 into the position shown in Figure 10 wherein the contact member 72 closes on the contact 74.

At this time the thermostatic switch 162 is connected in series with the relay coil 166, and a circuit is also completed through the solenoid actuator 144 which throws the hold-fire cycling control out of engagement with the drive motor. Under these conditions the relay coil 166 is energized or de-energized as determined by the thermostatic switch 162.

When the temperature of the building being heated by the stoker controlled furnace reaches a predetermined temperature, the switch 162 opens and the relay coil 166 is de-energized and in turn de-energizes the stoker motor 170. As mentioned before, the control circuit for the relay coil 166 can include stack controls, low water controls, and other control devices that are well known in the art, if desired.

At the end of a normal day time operating cycle the switch mechanism 68 is engaged by the cam associated with the dial and pointer 20, 22 and is shifted into position to close the contact member 72 on the contact 76. At this time the thermostatic switch 162 is cut out of the circuit and loses its control over the relay coil 166. The circuit through the solenoid actuator 144 is also interrupted and its control over the hold-fire cycling control is also lost.

As explained before, with the solenoid actuator 144 de-energized the torsion spring 122 will shift the swinging bracket 78 into position to bring the gears 112 and 86 into engagement. This commences a timing cycle which will determine the length of time that the toggle switch 132 will be closed. This switch is in series with the relay coil 166 and thus determines a period of energization for the said relay coil and therethrough of the stoker motor 170. Normally, this period of energization of the stoker motor is a matter of a few minutes every half hour or hour, depending upon the average outside temperature and the requirements of the building being heated and, in general, is well known in the stoker art.

Normally, the hold-fire cycling control will continue to operate unless the temperature of the building being warmed reaches a predetermined amount, at which time the thermostatic switch at 152 will close and will complete a circuit through the solenoid actuator 144 which will throw the hold-fire cycling control into inoperative position, thus permitting the relay coil 166 and stoker motor 170 to remain de-energized until the building temperature is again reduced to permit the thermostatic switch 152 to open.

Normally, the thermostatic switch 152 is set to open at a lower temperature than that at which the switch 162 will close, and preferably both of the thermostatic switches are adjustable according to well known practices.

After a predetermined period of operation under the cycling hold-fire control, the cam associated with the pointer and dial 18, 22 will again become effective to move the switch mechanism 68 into its Figure 10 position, and the stoker control will again operate on a normal day time cycle.

It will be understood that this invention is susceptible to modification in order to adapt it to different usages and conditions and, accordingly, it is desired to comprehend such modifications within this invention as may fall within the scope of the appended claims.

We claim:

1. In a time switch; a clock works, a first switch having two operative positions, cam means driven by said clock works for alternately moving said switch into said positions, a second switch, means for actuating said second switch and adapted for being drivingly engaged with said clockworks, means periodically for engaging and disengaging said second switch actuating means and said clockworks, and electrical means energizable for making said last-mentioned means ineffective and connected to said first switch so as to be energized when the said first switch is in one of its operative positions.

2. In a time switch having a clock works; a first switch, means driven by said clockworks for alternately actuating said first switch first into one position and then into another during a twenty-four hour period, a second switch adapted for being connected in parallel with said first switch, mechanism operable to actuate said second switch according to a predetermined time cycle, means for periodically engaging said mechanism with said clockworks to be driven thereby and for disengaging the mechanism from said clock works, to obtain intermittent actuation of said second switch, electrical means energizable for making said last-mentioned means ineffective, and means connecting said electrical means with said first switch so as to be energized in one operative position of said first switch.

3. In a timing device; a driven gear, a bracket, a shaft rotatably supporting said bracket, a gear train in said bracket adapted for engagement with said gear upon movement of said bracket in one direction about its supporting shaft, a torsion spring biasing said gear train opposite its driven direction, abutment means on said gear train and bracket adapted for engagement in response to the driving of said gear train a predetermined amount for moving said bracket out of gear engaging position thereby to release said gear train and to permit said spring to return it to its starting position, said abutment means also being engageable in response to the return of said gear train to its starting position for again moving said bracket into its gear engaging position, and resilient means acting on said bracket to cause it to move with snap action between its two operative positions.

4. In a timing device; a driven gear, a bracket, a shaft rotatably supporting said bracket, a gear train in said bracket adapted for engagement with said gear upon movement of said bracket in one direction about its supporting shaft, a torsion spring biasing said gear train opposite its driven direction, abutment means on said gear train and bracket adapted for engagement in response to the driving of said gear train a predetermined amount for moving said bracket out of gear engaging position thereby to release said gear train and to permit said spring to return it to its starting position said abutment means also being engageable in response to the return of said gear train to its starting position for again moving said bracket into its gear engaging position, said abutment means comprising spaced stop means on said bracket and an arm driven by said gear train and movable between said members, and resilient means acting on said bracket to cause it to move with snap action between its two operative positions.

5. In a timing device; a driven gear, a bracket, a shaft rotatably supporting said bracket, a gear train in said bracket adapted for engagement with said gear upon movement of said bracket in one direction about its supporting shaft, a torsion spring biasing said gear train opposite its driven direction, abutment means on said bracket and gear train engageable in response to the driving of said gear train a predetermined amount for moving said bracket out of gear engaging position thereby to release said gear train and to permit said spring to return it to its starting position, said abutment means also being responsive to the return of said gear train to its starting position for again moving said bracket into its gear engaging position, said abutment means comprising spaced stop means on said bracket and an arm driven by said gear train and movable between said members, means for adjusting the angular spacing of said stop members to determine the driven period of said gear train, and resilient means acting on said bracket to cause it to move with a snap action between its two operative positions.

6. In a timing device; a driven gear, a bracket, a shaft rotatably supporting said bracket, a gear train in said bracket adapted for engagement with said driven gear in one position of said bracket and including a gear fixed to said shaft, a torsion spring biasing said shaft to urge said gear train opposite its driven direction, abutment means comprising spaced abutments on said bracket and an arm on said shaft for engagement with said abutments for moving said bracket out of gear engaging position in response to a predetermined movement thereof when driven, said abutment means also being responsive to the return of said gear train under the influence of said torsion spring to its starting position for again moving said bracket into a gear engaging position, a cam on said shaft driven by said gear train, a switch positioned to be moved into one operative position by said cam during the driven period thereof and to be moved into another operative position by said cam during the return movement thereof, and resilient means acting on said bracket to cause it to move with a snap action between its two operative positions.

7. In a timing device; a driven gear, a bracket, a shaft rotatably supporting said bracket, a gear train in said bracket adapted for engagement with said driven gear in one position of said bracket and including a gear fixed to the shaft, a torsion spring acting on said shaft and biasing said gear train opposite its driven direction, spaced abutments on said bracket, an arm on said shaft between said abutments whereby a predetermined movement of said gear train when driven will move said bracket out of gear engaging position, and the return of said gear train under the influence of said torsion spring to its starting position will again move said bracket into a gear engaging position, a cam on said shaft driven by said gear train, and a switch positioned to be moved into one operative position by said cam during the driven period thereof and to be moved into another operative position by said cam during the return movement thereof, said cam being adjustably connected with said shaft to determine the portion of the driven period thereof during which said switch will be in each of its operative positions, and resilient means acting on said bracket to cause it to move between its operative position with a snap action.

8. In a timing device; a frame, a driven gear, a bracket, a shaft journalled in said frame and rotatably supporting said bracket, a gear train in said bracket adapted for engagement with said driven gear in one position of said bracket and including a gear fixed to said shaft, a torsion spring between said frame and shaft biasing said shaft opposite its driven direction, abutment means on said bracket and shaft engageable in response to a predetermined movement of said shaft when driven for moving said bracket out of gear engaging position, said abutment means also being engageable in response to the return of said shaft under the influence of said torsion spring to its starting position for again moving said bracket into a gear engaging position, resilient means acting on said bracket to cause it to move with snap action between its two operative positions, and means selectively operable for retaining said bracket in its gear disengaging position.

9. In a timing device; a frame, a driven gear, a bracket, a shaft journalled in said frame and rotatably supporting said bracket, a gear train in said bracket adapted for engagement with said driven gear in one position of said bracket and including a gear fixed to said shaft, a torsion spring between said frame and shaft biasing said shaft opposite its driven direction, abutment means on said bracket and shaft engageable in response to a predetermined movement of said shaft when driven for moving said bracket out of gear engaging position, said abutment means also being engageable in response to the return of said shaft under the influence of said torsion spring to its starting position for again moving said bracket into a gear engaging position, resilient means acting on said bracket to cause it to move with snap action between its two operative positions, and means for retaining said bracket in its gear disengaging position, said last mentioned means comprising a solenoid armature means selectively energizable for moving and retaining said bracket into its gear disengaging position.

HARRY G. MANSON.
ROBERT P. HANSEN.

REFERENCES CITED

The following references are of record in the file of this patent:

UNITED STATES PATENTS

| Number | Name | Date |
|---|---|---|
| 1,026,586 | Howlin | May 14, 1912 |
| 1,440,803 | Uphoff | Jan. 2, 1923 |
| 1,860,159 | Porter | May 24, 1932 |
| 1,885,963 | Teeple | Nov. 1, 1932 |
| 2,064,656 | Goff | Dec. 15, 1936 |
| 2,119,187 | Teeple | May 31, 1938 |
| 2,163,419 | Warren | June 20, 1939 |
| 2,439,842 | Clark | Apr. 20, 1948 |